(12) United States Patent
Chevillard et al.

(10) Patent No.: US 9,556,538 B2
(45) Date of Patent: *Jan. 31, 2017

(54) POLYETHYLENE FIBERS AND PROCESSES OF FORMING THE SAME

(71) Applicant: FINA TECHNOLOGY, INC., Houston, TX (US)

(72) Inventors: Cyril Chevillard, Dickinson, TX (US); Wyman Stephens, Baytown, TX (US); John Ashbaugh, Houston, TX (US); Fengkui Li, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/064,478

(22) Filed: Oct. 28, 2013

(65) Prior Publication Data

US 2014/0048963 A1    Feb. 20, 2014

Related U.S. Application Data

(63) Continuation of application No. 12/325,804, filed on Dec. 1, 2008, now Pat. No. 8,623,982.

(51) Int. Cl.
*C08F 4/50* (2006.01)
*D01D 5/10* (2006.01)
*C08F 110/02* (2006.01)
*D01F 6/04* (2006.01)

(52) U.S. Cl.
CPC ............... *D01D 5/10* (2013.01); *C08F 110/02* (2013.01); *D01F 6/04* (2013.01)

(58) Field of Classification Search
CPC .................................. C08F 110/02; C08F 4/50
USPC .................................................... 526/328, 99
See application file for complete search history.

(56) References Cited

U.S. PATENT DOCUMENTS

| | | | | |
|---|---|---|---|---|
| 4,430,852 A * | 2/1984 | Hatcher | ................... | D01D 5/12 264/211.14 |
| 5,192,729 A * | 3/1993 | Woo | ....................... | C08F 10/02 502/104 |
| 2007/0134478 A1* | 6/2007 | Haberer | ................... | D01D 4/02 428/219 |

* cited by examiner

*Primary Examiner* — Yong Chu
*Assistant Examiner* — Sonya Wright
(74) *Attorney, Agent, or Firm* — Albert Shung

(57) ABSTRACT

Fibers and methods of forming the fibers are described herein. The fibers generally include an ethylene based polymer exhibiting a molecular weight distribution of from about 2 to about 8.

14 Claims, No Drawings

POLYETHYLENE FIBERS AND PROCESSES OF FORMING THE SAME

CROSS-REFERENCE TO RELATED APPLICATIONS

This application is a Continuation of U.S. application Ser. No. 12/325,804, filed on Dec. 1, 2008.

FIELD

Embodiments of the present invention generally relate to fibers, and in particular to fibers formed from polyethylene.

BACKGROUND

As reflected in the patent literature, fibers have generally been formed of propylene based polymers due to its low cost, processability and physical properties. Attempts have been made to utilize ethylene based polymers to form such fibers. However, such attempts have not generally resulted in adequate processability and physical properties. Therefore, it would be desirable to develop ethylene based polymers for use in fiber production.

SUMMARY

Embodiments of the present invention include fibers and methods of forming the fibers.

The fibers generally include an ethylene based polymer exhibiting a molecular weight distribution of from about 2 to about 8.

The methods generally include providing an ethylene based polymer, wherein the ethylene based polymer exhibits a molecular weight distribution of from about 2 to about 8, heating the ethylene based polymer to a molten state, extruding the ethylene based polymer to form a fiber and spinning the fiber at a desired spinning speed.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Embodiments of the invention generally relate to fibers formed from ethylene based polymers.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. As is known in the art, the catalysts may be activated for subsequent polymerization and may or may not be associated with a support material. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

A specific example of a Ziegler-Natta catalyst includes a metal component generally represented by the formula:

$$MR^A_x;$$

wherein M is a transition metal, $R^A$ is a halogen, an alkoxy or a hydrocarboxyl group and x is the valence of the transition metal. For example, x may be from 1 to 4.

The transition metal may be selected from Groups IV through VIB (e.g., titanium, vanadium or chromium), for example. $R^A$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAl) and triisobutyl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates, or dialkoxybenzenes, for example. (See, U.S. Pat. Nos. 5,945,366 and 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The Z-N support materials may include a magnesium dihalide, such as magnesium dichloride or magnesium dibromide, or silica, for example.

In one specific embodiment, the Ziegler-Natta catalyst is formed by contacting a magnesium dialkoxide compound with sequentially stronger chlorinating and/or titanating agents. For example, the Ziegler-Natta catalyst may include those described in U.S. Pat. Nos. 6,734,134 and 6,174,971, which are incorporated by reference herein.

The Ziegler-Natta catalysts may be formed by methods generally including contacting an alkyl magnesium compound with an alcohol to form a magnesium dialkoxide compound. Such reaction may occur at a reaction temperature ranging from room temperature to about 90° C. for a time of up to about 10 hours, for example. The alcohol may be added to the alkyl magnesium compound in an equivalent of from about 0.5 to about 6 or from about 1 to about 3, for example.

The alkyl magnesium compound may be represented by the following formula:

$$MgR^1R^2;$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol may be represented by the formula:

$$R^3OH;$$

wherein $R^3$ is selected from $C_2$ to $C_{20}$ alkyl groups. Non-limiting illustrations of alcohols generally include butanol, isobutanol and 2-ethylhexanol, for example.

The methods may then include contacting the magnesium dialkoxide compound with a first agent to form reaction product "A". Such reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at a temperature of from about 0° C. to about 100° C. or from about 20° C. to about 90° C. for a time of from about 0.2 hours to about 24 hours or from about 1 hour to about 4 hours, for example.

Non-limiting examples of the first agent are generally represented by the following formula:

$$ClA(O_xR^4)_y;$$

wherein A is selected from titanium, silicon, aluminum, carbon, tin and germanium, $R^4$ is selected from $C_1$ to $C_{10}$ alkyls, such as methyl, ethyl, propyl and isopropyl, x is 0 or 1 and y is the valence of A minus 1. Non-limiting illustrations of first agents include chlorotitaniumtriisopropoxide $ClTi(O^iPr)_3$ and $ClSi(Me)_3$, for example.

The methods may then include contacting reaction product "A" with a second agent to form reaction product "B". Such reaction may occur in the presence of an inert solvent. The inert solvents may include any of those solvents previously discussed herein, for example. The reaction may further occur at a temperature of from about 0° C. to about 100° C. or from about 20° C. to about 90° C. for a time of from about 0.2 hours to about 36 hours or from about 1 hour to about 4 hours, for example.

The second agent may be added to reaction product "A" in an equivalent of from about 0.5 to about 5, or from about 1 to about 4 or from about 1.5 to about 2.5, for example.

The second agent may be represented by the following formula:

$$TiCl_4/Ti(OR^5)_4;$$

wherein $R^5$ is selected from $C_2$ to $C_{20}$ alkyl groups. Non-limiting illustrations of second agents include blends of titanium chloride and titanium alkoxides, such as $TiCl_4/Ti(OBu)_4$. The blends may have an equivalent of $TiCl_4:Ti(OR^5)_4$ of from about 0.5 to about 6 or from about 2 to about 3, for example.

The method may then include contacting reaction product "B" with a third agent to form reaction product "C". Such reaction may occur in the presence of an inert solvent. The inert solvents may include any of those solvents previously discussed herein, for example. The reaction may further occur at room temperature, for example.

Non-limiting illustrations of third agents include metal halides. The metal halides may include any metal halide known to one skilled in the art, such as titanium tetrachloride $(TiCl_4)$, for example. The third agent may be added in a equivalent of from about 0.1 to about 5, or from about 0.25 to about 4 or from about 0.45 to about 2.5, for example.

The method may further include contacting reaction product "C" with a fourth agent to form reaction product "D". Such reaction may occur in the presence of an inert solvent. The inert solvents may include any of those solvents previously discussed herein, for example. The reaction may further occur at room temperature, for example.

The fourth agent may be added to the reaction product "C" in an equivalent of from about 0.1 to about 5, or from about 0.25 to about 4 or from about 0.45 to about 2.0, for example.

Non-limiting illustrations of fourth agents include metal halides. The metal halides may include any metal halide previously described herein.

The method may then include contacting reaction product "D" with a fifth agent to form the catalyst component. The fifth agent may be added to the reaction product "D" in an equivalent of from about 0.1 to about 2 or from about 0.5 to about 1.2, for example.

Non-limiting illustrations of fifth agents include organo-aluminum compounds. The organoaluminum compounds may include aluminum alkyls having the following formula:

$$AlR^6_3;$$

wherein $R^6$ is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), n-octyl aluminum and n-hexyl aluminum, for example.

Polymerization Processes

As indicated elsewhere herein, catalyst systems are used to form polyolefin compositions, Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735 and 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. Nos. 4,271,060, 5,001,205, 5,236,998 and 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375 and 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any suitable method, such as via a double jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

The polymers may have a narrow molecular weight distribution ($M_w/M_n$). As used herein, the term "narrow molecular weight distribution" refers to a polymer having a molecular weight distribution of from about 1.5 to about 8, or from about 2.0 to about 7.5 or from about 2.0 to about 7.0, for example.

In one or more embodiments, the polymers include ethylene based polymers. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. % or at least about 90 wt. % polyethylene relative to the total weight of polymer, for example.

The ethylene based polymers may have a density (as measured by ASTM D-792) of from about 0.86 g/cc to about 0.98 g/cc, or from about 0.88 g/cc to about 0.965 g/cc, or from about 0.90 glee to about 0.965 glee or from about 0.925 g/cc to about 0.97 g/cc, for example.

The ethylene based polymers may have a melt index ($MI_2$) (as measured by ASTM D-1238) of from about 0.01 dg/min to about 100 dg/min., or from about 0.01 dg/min. to about 25 dg/min., or from about 0.03 dg/min. to about 15 dg/min. or from about 0.05 dg/min. to about 10 dg/min, for example.

In one or more embodiments, the polymers include high density polyethylene. As used herein, the term "high density polyethylene" refers to ethylene based polymers having a density of from about 0.94 g/cc to about 0.97 g/cc, for example.

In one or more embodiments, the ethylene based polymers are formed from a Ziegler-Natta catalyst.

In one or more embodiments, the ethylene based polymers are uni-modal. As used herein, the term "uni-modal" refers to a composition exhibiting a single molecular weight peak on a GPC plot.

In one or more embodiments, the ethylene based polymers are substantially linear.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or, co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope; twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

In particular, embodiments of the invention are useful for forming fibers including yarn and filaments. As used herein, the term "yarn" refers to a fiber formed from short fibers spun together continuously. The term "filament" refers to a continuous yarn produced directly by extruding from liquid polymer. In one or more embodiments, the article includes continuous fibers (e.g., filaments, which are referred to herein in specific embodiments as yarn). The yarn and filaments described herein may be used in applications known to one skilled in the art, such as carpet and textile applications.

One or more embodiments of the invention utilize the ethylene based polymers described above to form fibers. It has been observed that the fibers formed from embodiments of the invention generally result in improved resiliency, lower luster and softer hand than those applications utilizing propylene homopolymers.

In one specific embodiment of the invention, the fiber includes soft touch fibers. As used herein, the term "soft touch fiber" refers to the soft touch feel of a fabric, generally referred to as hand. Generally, both finer denier and lower modulus contribute to the "softness" feel of the fibers and fabrics. It has been discovered that the ethylene based polymers described above may possess significantly improved fiber spinnability, thereby making it possible to produce finer denier fibers from ethylene based polymers. The soft touch fibers described herein may be used in applications known to one skilled in the art, such as non-woven applications including diapers. As used herein, the term "non-woven" is used to describe fabrics made through means other than weaving or knitting.

In one or more embodiments, the fibers formed by the ethylene based polymers exhibit a tenacity at maximum load of from about 2.0 g/denier at a draw ratio of 3:1 to about 3.3 g/denier or from about 2.0 g/denier to about 3.0 g/denier, for example.

In one or more embodiments, the fibers exhibit a percent elongation at maximum load of from about 250% at a draw ratio of 3:1 to about 325%, or from about 250% to about 300% or from about 250% to about 275%, for example.

It has further been observed that the fibers formed by the ethylene based polymers described herein also exhibit resistance to gamma radiation sterilization. See, U.S. Pat. No. 5,554,437 for a discussion of gamma radiation sterilization, which is incorporated by reference herein.

EXAMPLES

Polymer "A" was formed from a Ziegler-Natta formed polyethylene having a density of 0.962 g/cc and a molecular weight distribution of 6.0, commercially available from TOTAL PETROCHEMICALS USA, Inc. as 6450.

Polymer "B" was formed from a Ziegler-Natta formed polypropylene, commercially available from TOTAL PETROCHEMICALS USA, Inc. as 3762.

Monofilament fibers were formed from the polymer samples and analyzed. The fiber was spun at a forward spinning speed of 770 meters per minute to produce a fully oriented fiber (FOY) using a two stage godet assembly heated up at 80° C., 85° C. and 90° C. respectively. A maximum spinning speed of 2000 m/min was measured. The FOY fiber was spun at 3:1, 5:1 and a maximum 7:1 draw ratio (DR).

The results are shown in Table 1 below.

TABLE 1

|  | Polymer A | | | Polymer B | |
| --- | --- | --- | --- | --- | --- |
|  | FOY # DDR 3:1 | FOY # DDR 5:1 | FOY # DDR 7:1 (Max) | FOY # DDR 3:1 | FOY # DDR 5:1 (Max) |
| Tenacity @ Max Load [g/denier] | 2.5 +/− 0.1 | 3.3 +/− 0.1 | 3.2 +/− 0.4 | 2.5 | 3.3 |
| Tenacity @ Break [g/denier] | 2.2 +/− 0.1 | 2.9 +/− 0.1 | 2.9 +/− 0.3 | 2.2 | 2.9 |
| Modulus @ 5% Elongation [g/denier] | 8 +/− 1 | 13 +/− 1 | 24 +/− 1 | 5 | 16 |

TABLE 1-continued

|  | Polymer A | | | Polymer B | |
| --- | --- | --- | --- | --- | --- |
|  | FOY # DDR 3:1 | FOY # DDR 5:1 | FOY # DDR 7:1 (Max) | FOY # DDR 3:1 | FOY # DDR 5:1 (Max) |
| % Elongation @ Max Load [%] | 251 +/− 25 | 92 +/− 14 | 36 +/− 23 | 199 | 102 |
| % Elongation @ Break [%] | 278 +/− 22 | 113 +/− 9 | 54 +/− 26 | 218 | 111 |
| % Shrinkage at 100° C. | 19.9 | 15.7 | 8.2 | 6.4 | 7.4 |

It was observed that the polyethylene fibers exhibited improved processability and mechanical properties (e.g., a tenacity at maximum load that ranged from 2.2 g/denier at DR 3:1 to 3 g/denier at DR 7:1 and a percent elongation at maximum load that ranged from 278% at DR 3:1 to 54% at DR 7:1). In fact, the polyethylene fibers had a tenacity and elongation at max comparable to polypropylene fiber that ranged from 2.5 g/denier at DR 3:1 to 3.3 g/denier at DR 5:1 and a percent elongation at break that ranged from 251% at DR 3:1 to 92% at DR 5:1.

While the foregoing is directed to embodiments of the present invention, other and further embodiments of the invention may be devised without departing from the basic scope thereof and the scope thereof is determined by the claims that follow.

What is claimed is:

1. A method of forming fiber comprising:
   providing an ethylene based polymer exhibiting a molecular weight distribution of from about 2 to about 8 wherein the ethylene based polymer comprises at least 50 wt. % polyethylene relative to a total weight of the ethylene based polymer;
   heating the ethylene based polymer to a molten state;
   extruding the ethylene based polymer to form a fiber, wherein the fiber exhibits a tenacity at maximum load of from about 2.0 g/denier at a draw ratio of 3:1 to about 3.3 g/denier; and
   spinning the fiber at a desired spinning speed.

2. The method of claim 1, wherein the ethylene based polymer is formed by a Ziegler-Natta catalyst.

3. The method of claim 2, wherein the Ziegler-Natta catalyst is formed by:
   contacting an alkyl magnesium compound with an alcohol to form a magnesium dialkoxide compound;
   contacting the magnesium dialkoxide compound with a plurality of first agents to form reaction product "A";
   contacting reaction product "A" with a second agent to form reaction product "B", wherein the second agent comprises a transition metal and a halogen;
   contacting reaction product "B" with a third agent to form reaction product "C", wherein the third agent comprises a first metal halide and wherein the third agent is a stronger halogenating agent than the second agent;
   optionally contacting reaction product "C" with a fourth agent to form reaction product "D", wherein the fourth agent comprises a second metal halide and wherein the fourth agent is a stronger halogenating agent than the third agent; and
   contacting reaction product "D" with fifth agent to form a Ziegler-Natta catalyst component, wherein the fifth agent comprises an organoaluminum compound.

4. The method of claim 1, wherein the ethylene based polymer is linear.

5. The method of claim 1, wherein the ethylene based polymer is uni-modal.

6. The method of claim 1, wherein the ethylene based polymer exhibits a density of at least about 0.94 g/cc.

7. The method of claim 1, wherein the fiber is a soft touch fiber.

8. The method of claim 1, wherein the fiber is a fine denier monofilament that exhibits increased resistance to gamma radiation sterilization over a fiber formed from an identical process with a Ziegler-Natta formed polypropylene homopolymer.

9. The method of claim 1, wherein the ethylene based polymer comprises at least 70 wt. % polyethylene relative to a total weight of the ethylene based polymer.

10. The method of claim 1, wherein the ethylene based polymer comprises at least 75 wt. % polyethylene relative to a total weight of the ethylene based polymer.

11. The method of claim 1, wherein the ethylene based polymer comprises at least 80 wt. % polyethylene relative to a total weight of the ethylene based polymer.

12. The method of claim 1, wherein the ethylene based polymer comprises at least 85 wt. % polyethylene relative to a total weight of the ethylene based polymer.

13. The method of claim 1, wherein the ethylene based polymer comprises at least 90 wt. % polyethylene relative to a total weight of the ethylene based polymer.

14. The method of claim 1, wherein the ethylene based polymer has a melt index ($MI_2$) of from 0.01 to 15 dg/min, as measured by ASTM D-1238.

* * * * *